Patented July 1, 1930

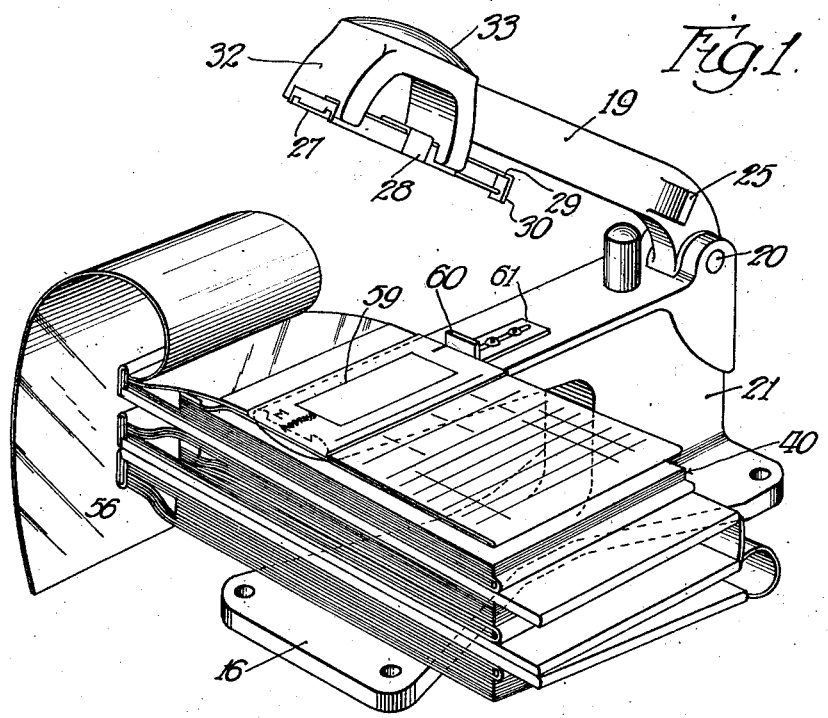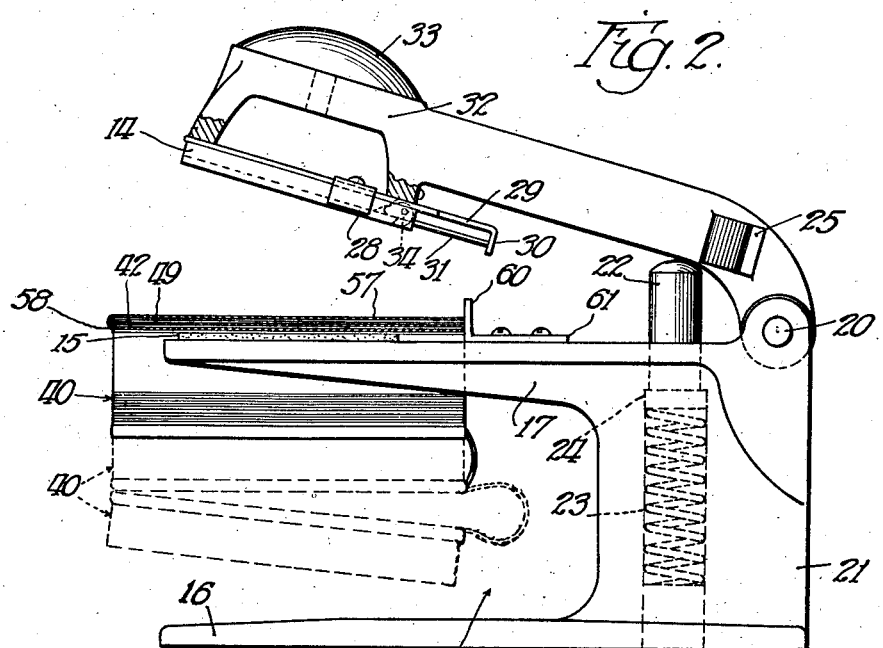

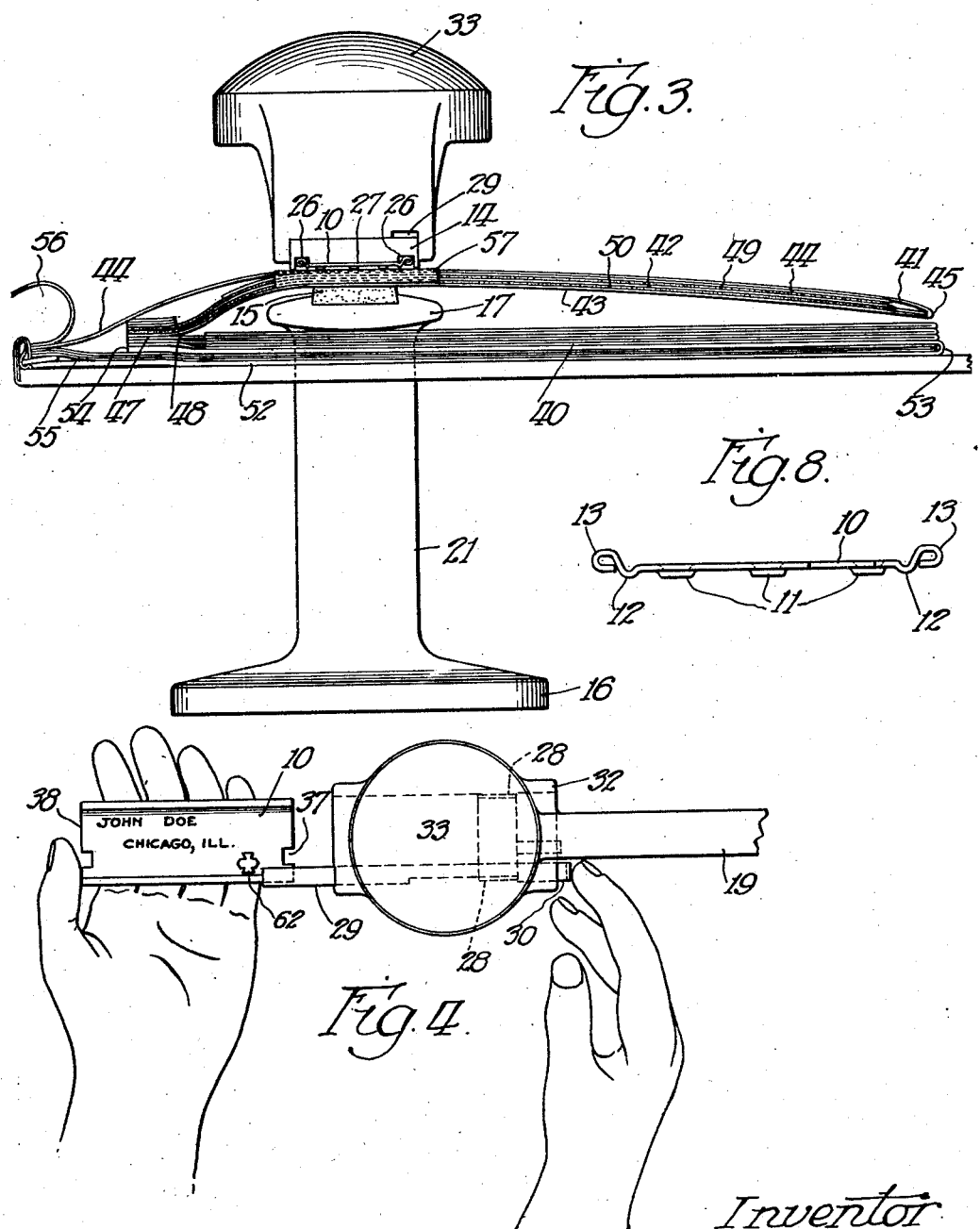

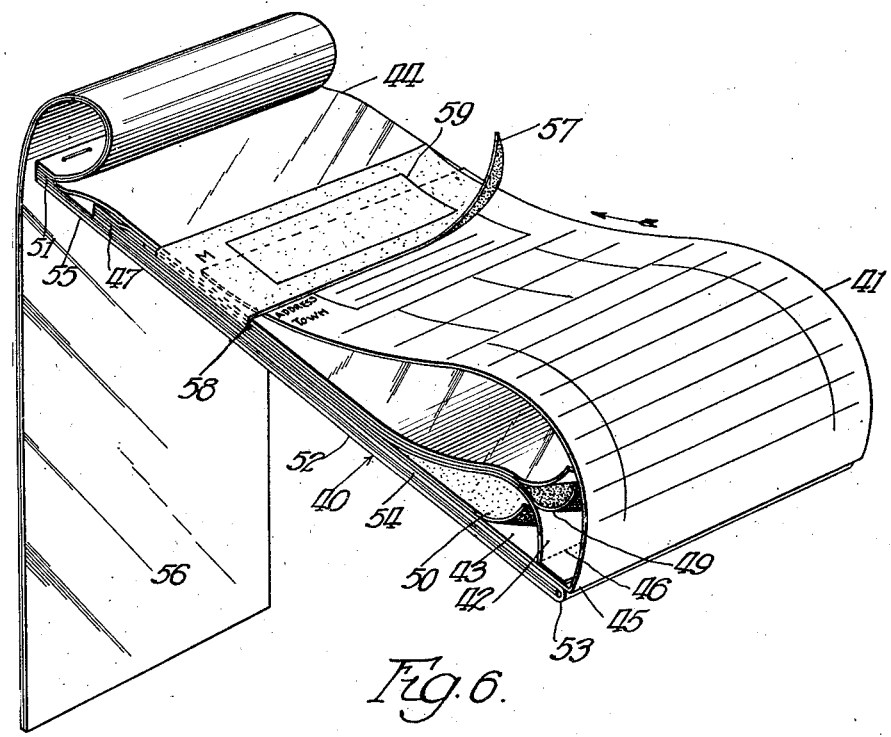

1,769,028

UNITED STATES PATENT OFFICE

JOHN E. JOHNSON, OF CHICAGO, ILLINOIS, ASSIGNOR TO SPEEDAUMAT MANUFACTURING COMPANY, OF CHICAGO, ILLINOIS, A CORPORATION OF DELAWARE

DEVICE FOR RECORDING SALES TRANSACTIONS

Application filed November 18, 1926. Serial No. 149,169.

This invention relates to the mechanics of business transactions, such, for example, as the purchasing and recording of sales, of retail merchandise; and aims to provide improved means for expediting and increasing the reliability and accuracy of such transactions.

The invention may be readily understood by reference to one exemplification thereof as applied to retail merchandising and recording of retail sales transactions. Such exemplification of the invention is illustrated in the accompanying drawings.

In said drawings:

Fig. 1 illustrates in perspective one form of sales record associated with an imprinting device for recording certain data involved in a sales transaction.

Fig. 2 is a sectional side elevation of the arrangement illustrated in Fig. 1.

Fig. 3 is a front elevation of the same arrangement, the imprinting device being illustrated in the act of imprinting the data referred to.

Fig. 4 is a plan view of the active portion of the imprinting device illustrating the manner of inserting and removing an imprinting element which supplies the data.

Fig. 5 is a perspective view of the illustrative sales book.

Fig. 6 is a longitudinal section through the movable head of the imprinting device illustrating a device for assisting the correct positioning of the imprinting element in the imprinting head.

Fig. 7 is a bottom plan view of the construction illustrated in Fig. 6.

Fig. 8 is an enlarged end elevation of the illustrative form of sales token and imprinting element.

In the present embodiment of the invention, the physical instrumentalities employed cooperate to record upon a sales record in an invariably legible form, certain data specific to the customer, such as the customer's name, address, credit rating, etc. These cooperating instrumentalities comprise a token of size and shape convenient to be carried by the customer and bearing in legibly embossed characters the customer's name, address, etc.; a sales record upon which the customer-data may be imprinted by the embossed characters on the token on as many copies as may be desired; and a device for associating the sales book and token whereby the data may be conveniently, legibly and accurately recorded on the sales record.

The present embodiment of the invention avoids direct contact of the customer token with the ink or other imprinting medium, whereby the token may be returned to the customer in unsoiled condition and the possibility of soiling the customer's hands or gloves may be avoided.

The customer-carried token or imprinting element comprises in this instance a plate 10 of metal sufficiently ductile and malleable that it may be embossed (and re-embossed if need be to correct errors or make changes) to provide in relief, clear and sharp printing characters 11, that is, characters which will print clearly and sharply. The obverse or intaglio side of the plate exhibits the characters in normal order so that the data may easily be read.

The long sides of the plate carry reinforcement in the form of longitudinal ribs 12 and marginal finishing beads 13, the latter serving also to provide the plate with smooth rounded edges. The side edges of the token being smooth, round, and free from sharp projections or indentations, wear upon the purse, pocket or clothing of the customer is minimized and the token is rendered susceptible to convenient handling, thereby preventing any reluctance on the part of customers to develop the habit of carrying the token and using it in making purchases. The marginal reinforcement prevents bending of the relatively soft metal of the token by much handling and preserves it in the flat condition desirable when the token is used to print upon a sales record. In this connection the embossed surface of the plate also supplies a certain longitudinal and transverse reinforcement against bending. The beads 12 extend approximately into the plane of the top surface of the embossed characters 11, thereby reducing somewhat the wear on the faces of the characters encountered in the normal handling of the token. The foregoing structural features adapt the token to be continuously carried by a customer and to receive without damage such handling as it would thereby be subjected to.

The illustrative device for operatively associating the token and sales record comprises a releasable token holder and a platen 15 (in this instance advantageously formed of a slightly resilient material such as composition fiber or hard rubber), the latter being supported in elevated position above the base 16 of the device by a supporting arm 17 to provide a space 18 to receive the idle portions of the sales book or books (in this case separate cash, charge and C. O. D. sales books comprise a unit—see Fig. 2),—whereby the sheet or sheets upon which a given record is to be made can be isolated from the balance of the record or record book and supported in an invariable position relative to the sales token at the time of the actual imprinting. By isolating from the balance of sales book or records those sheets which are to receive the impression, the legibility of the printed matter is not affected or influenced by the thickness of the sales book or reductions in thickness thereof through removal of used sheets; nor is such legibility affected by inequalities in the resilience or cushioning effect of a thick pile of records. In other words, the isolated sheets supported by platen 15 present a surface which is preferably uniform as regards the amount of give or yield under the printing pressure of the token, and as compared with printing upon a thick pile of sheets in which inequalities are cumulative and which would yield more readily in one spot than another, resulting in a printed impression which would be correspondingly faint or illegible in spots.

In this instance, the relative movement between the platen 15 and holder 14 is effected by movably supporting the holder on an arm hinged at 20 to the standard 21. The arm 19 is normally yieldingly held in an appropriately elevated condition (see Fig. 2) by a resilient device in the form of a plunger 22 (elevated by spring 23) inside standard 21. A stop collar 24 limits the upward travel of the plunger. The pressure of plunger 22 while sufficient to elevate arm 19 offers no considerable resistance when the arm is operated to imprint the token on the record. The arm 19, may, if desired, be completely inverted by swinging around pivot 20 so as to bring the token holder face up, thereby placing it in a convenient position to receive a token. In such case the engagement of stop 25 with the standard holds the arm in approximately a horizontal position.

The printing plate or token holder 14 comprises in this instance a foundation or platen plate longitudinally grooved at 26 to receive the edge beading 13 of the token and having a flat middle area 27 which directly backs the area of the token bearing the embossed characters. The token is releasably held in and against the holder, in this instance by spring fingers 28 lying along a part of the grooves 26 and engaging the side edges of the plate. The surface 27 of the token holder 14 is so adjusted that it will bring the printing surface of a token into exact parallelism with the platen 15 when such surface is spaced therefrom a distance equal to the aggregate thickness of the record and other sheets supported on the platen. This arrangement results in uniformity of the printed matter at all points and avoids any faint or illegible areas which result from lack of such parallelism.

While a token may be readily removed from the holder simply by prying up one edge a short distance (because the ends of the spring fingers extend only a very slight distance beyond their lines of contact with the beaded edges 13 of the plate), a convenient token ejector may advantageously be employed. The present ejector comprises a slide 29 which slides longitudinally of the holder along its back and is provided with a finger piece 30. A rod 31 operated thereby passes into and along one of the grooves 26 in the holder upon a forward movement of the ejector and slides the token longitudinally out of the holder. The ejector is moved back to the rearward position whenever another token is put in place.

The holder 14 is appropriately carried in a recess in the head 32 formed at the extremity of arm 19. At the upper side of the head 33 a striking pad of hardened rubber or fiber is advantageously provided.

The present holder is arranged advantageously to assist in the insertion of the printing plate therein in correct position, that is, with the embossed characters out. The height of the embossed characters 11 is such that when in contact with the backing surface 27 they would hold the beaded edges 13 sufficiently far out of the holder that such edges would be beyond the grasp of the spring fingers 28, and the plate would, therefore, not be caught in the holder. In other words, the plate will only enter the holder when its intaglio side (that side which exhibits the characters in their normal arrangement) is in engagement with the surface 27 of the holder. Further to assist in the correct placing of the token in the holder, the latter is provided with a projection or lug in the form of an ejecting cam 34 pivoted at 35 in the holder, which will not allow a token to be pushed entirely into the holder unless the embossed characters occupy a definite position relative to the holder. For example, in the present device unless the characters occur in upright position as indicated in Fig. 4, the plate cannot be pushed entirely into the holder. When in proper position as thus defined, the projecting arm 36 of cam 34 enters notch 37 at one end of the plate. If, however, the plate be reversed, its incorrect position would be observed by the sales person when the engagement of the straight edge 38 of the plate with the projection 36 prevented the insertion of the plate entirely into the holder. If, however, the sales person persists in an effort to force the plate incorrectly into the holder, the continued pressure against arm 36 would be transmitted through surface 39 of the cam (as it rotated) to the back of the plate, thereby forcing it out of the grasp of the spring fingers 28. The cam and projection 36 are returned to normal position by a spring (see Fig. 6).

The plates are conveniently provided at their other ends with notches opposite and corresponding to notches 37, whereby the plates may be conveniently held in stacks in galleys or racks for storage or prior to embossing. Such galleys or racks may be associated with the embossing machines into which the plates are fed successively to receive the desired data.

The illustrative sales record comprises in this instance a book 40 containing a plurality (fifty, for example) of groups of record sheets,—the number of sheets in each group may vary depending on the number of copies desired of the record of a given sales transaction. In the present instance, each group of record sheets comprises the detachable original sheet 41, two similar detachable copy sheets 42 and 43, and a nondetachable record sheet 44 (intended to remain in the book) which in the present case is a translucent tissue sheet. The group of similar sheets 41, 42 and 43 are secured together at their lower ends, as at 45 and made detachable from each other by lines of scoring or perforations 46 at or adjacent their lower ends; they are fastened with similar groups in pad form 47 by appropriate securing means which connect or pass through the upper or top ends of the lower sheet 43 of each group, such sheets for this purpose extending beyond the upper ends of sheets 41 and 42. These lower sheets 43 are made detachable from the pad 47 by lines of scoring or perforations 48 adjacent their upper ends.

Duplication of the recorded data is effected on the various copy sheets by inking or printing media in the form of carbon sheets 49 and 50 secured at their upper ends in the same pad 47 with the sheets 43. Additional pairs of carbon sheets may be secured farther down in pad 47 to be used when the first set have been exhausted or when a given number of groups of sheets have been exhausted or when a given number of groups of sheets have been used and detached.

In use the carbon sheets are alternated, as illustrated in Fig. 5, with the copy sheets, whereby a simultaneous record may be made on all copies. In the present case carbon sheet 49 is covered with ink on both surfaces and is utilized to supply ink both to sheet 42 and the tissue sheet 44 which lies above the carbon sheet and receives the ink impression on its under surface. The translucent character of the tissue sheet renders the inked characters printed on its under face, visible and legible from its upper face. In the illustrative book the tissue sheets are grouped in a separate pad 51; and the cardboard back 52 of this pad is hinged at 53 to the cardboard back 54 of pad 47. In assembling a group of sheets the correct tissue sheet is isolated from the balance of the tissue sheets and placed directly below the original sheet 41 and on top of the double-faced carbon sheet 49. The previously used tissue sheets lie in pad form 55 below pad 47 and the unused sheets are folded back as indicated at 56 (see Fig. 5). The tissue sheets 44 are advantageously successively numbered to correspond with similar numbers on the groups of sheets, 41, 42 and 44, to provide means for identifying, if need be, the detached sheets by reference to the tissue sheets.

The means for isolating the token from direct contact with the inking or printing medium is herein represented by a cooperating sheet or strip 57, which may be placed to lie between the sales record and the token. The strip 57 is in this instance hinged to the side of the sales book at such a point that when the strip is laid over the face of the original sheet 41 it will cover the region on sheet 41 where it is desired to imprint the data carried on the token. The under face of strip 57 is advantageously supplied with ink or an inking medium whereby the data is imprinted on original sheet 41, the impression of the token being transferred to the other copies of the group of sheets by the carbon sheets 49 and 50. Whenever the sales book is desired to be used without utilizing a token the strip 57 may be turned aside to uncover the underlying space. Strip 57 may be conveniently attached as at 58 (by some adhesive, for example) to the side of carbon sheet 50. Additional strips 57 may be attached to such additional carbon sheets 50 as are bound in the sales book. Also strip 57 is advantageously provided with a guide line 59 for locating the sales record with reference to the data on the token so that such data may be properly located on the sales record (see Fig. 5). In this connection, an appropriate guide 60 adjustably secured to arm 17 further assists in accurately locating the sales record with reference to the data to be placed thereon. As shown (see Figs. 1 and 2), the base 61 of the guide is provided with slots through which fastening screws pass, whereby it may be adjusted to center the sales record transversely with reference to the token. The longitudinal centering of the sales record by the guide is effected by aligning a mark or line on the sales record with one of the edges of the guide. Such centering of the sales record makes possible the alignment of the data printed from the token with various legends on the sales record, such as "Address", "Town", etc.

While the installation of the above described system for retail merchandising, for example, does not preclude the making of purchases and recording of sales transactions (in the same sales books) without the use of the customer token, the advantages both to the customer and to the retail store resulting from the habitual use of the customer carried token, are so great that the customers will inevitably fully cooperate with the retail stores to effect the general and systematic use of customer tokens. From the standpoint of the customer whose effective cooperation requires the carrying and use of such a token whenever purchases are made, the speed of completing a given transaction at once impresses the customer. Furthermore, the errors, delays and failures in delivery are avoided as well as erroneous debits on the customer's charge account due to illegible or erroneous data on the sales record. Since the token is always returned to the customer in unsoiled condition, the latter is not reluctant to carry the token regularly.

From the standpoint of the department store the speed in completing a given sales transaction obviously is highly advantageous because a given sales person can complete a greater number of sales transactions. Whenever the volume of sales made by a sales person is reflected in the sales person's earnings obviously the sales person becomes directly interested in extending the use of the customer carried token. The outstanding advantage to the department store is, however, the avoidance of loss through illegible or erroneous data on the sales record. Loss from this source is wholly avoided by the use of such tokens.

A single token is capable of use in making purchases at a number of establishments. In such cases each establishment may emboss on the token an individual, private symbol 62 which may serve to indicate the credit rating of the customer. Other establishments when extending credit to a customer already supplied elsewhere with a token, may simply emboss the individual credit symbol of that establishment. Such symbol on the token may serve, if the management of a store so desire, to indicate to the sales person (who is familiar with the significance of the store's private symbols) the fact that certain credit has been extended to the customer to whom the token has been issued. On the other hand, a given establishment may not extend such significance to its symbols and may, on occasion, require proof of the purchaser's identity, etc., in the usual manner or that the sale be approved by an official, regardless of the possession by the customer of a token.

Obviously the invention is not limited to the details of the exemplification thereof herein illustrated and described, since such details may be variously modified. Moreover, it is not indispensable that all features of the invention be used conjointly, since various features may be advantageously employed (without others) in different practices and combinations.

Having described one embodiment of my invention, I claim:

1. Means for recording sales transactions upon a sales sheet comprising in combination a customer carried token bearing thereon in printing characters data specific to the customer, a printing device constructed and arranged to have said sales sheet associated therewith to receive an impression and having means for releasably holding a token and said means being movable to imprint said token on a sales sheet associated with said printing device, said sheet having an inking medium operatively combined therewith to be interposed between said token and said sheet which medium embodies means for preventing direct contact of the token with ink whereby the latter may be returned to the customer after the imprinting operation in unsoiled condition.

2. Means for recording sales transactions upon a sales record comprising in combination a customer carried token bearing thereon in printing characters data specific to the customer, a printing device having means for releasably holding a token and movable to imprint said token upon a sales record, said printing device being constructed and arranged so that a sales record may be associated therewith in a predetermined position relative to said token so that the token may be imprinted in a predetermined position on the sales record, said record having an ink supplying sheet operatively combined therewith to be interposed between said record and token and having the surface adjacent the token free from ink so that the token may be returned free from ink to the customer after the imprinting operation.

3. The combination for use in recording sales transactions comprising a customer carried token bearing in printing characters data specific to the customer, a printing device having means for operatively associating a token and a book of sales sheets including a holder for removably holding a token and movable to impress the latter upon the sheet of the sales book, a support for the sales sheet to be impressed including means for locating the sheet on said support in a predetermined position relative to said token whereby the impression of said token may be made in a predetermined place on said sheet; and ink supply medium carried by the sales book for supplying ink to said impression, said medium being provided with means for preventing contact of said token with ink so that said token may be returned to the customer in an unsoiled condition.

4. The combination for use in recording sales transactions comprising a customer carried token bearing in printing characters data specific to the customer, a printing device having means for operatively associating a token and a book of sales sheets including a holder for removably holding a token and movable to impress the latter upon the sheet of the sales book, a support for the sales sheet to be impressed including means for locating the sheet on said support in a predetermined position relative to said token whereby the impression of said taken may be made in a predetermined place on said sheet; and a carbon strip with an uninked upper surface attached to the side of the sales book and adapted to be folded over the positioned sales sheet to supply ink for said impression, said carbon strip being operative to permit the folding of used sheets over the end of said sales book.

5. The combination for use in recording sales transactions comprising a customer carried token bearing in printing characters data specific to the customer, a device for operatively associating a sales record and said token and for operating said token to imprint said data upon said sales record, the sales record having means for supplying a co-operating printing medium by which said data is reproduced on said record, and means for avoiding direct contact of the token with the imprinting medium.

6. The combination for use in recording sales transactions comprising a plurality of record sheets, a customer carried token bearing in printing characters data specific to the customer, a device for operatively associating a book of sales records and said token and for operating said token to imprint said data upon said sales record, and means carried by the book for supplying a co-operating printing medium by which said data is reproduced on said record and for interposing an impervious surface between said token and said printing medium whereby the token may act to imprint without direct contact with the printing medium.

In testimony whereof, I have signed my name to this specification.

JOHN E. JOHNSON.